United States Patent Office 2,917,497
Patented Dec. 15, 1959

2,917,497
POLYMERS OF 1,1-DIFLUOROBUTADIENE

Francis J. Honn, Westfield, N.J., assignor, by mesne assignments, to Minnesota Mining and Manufacturing Company, St. Paul, Minn., a corporation of Delaware No Drawing. Application August 2, 1954
Serial No. 447,407

10 Claims. (Cl. 260—87.5)

This invention relates to new and useful polymeric materials of 1,1-difluorobutadiene. In one aspect, this invention relates to the new and useful homopolymer of 1,1-difluorobutadiene. In another aspect, this invention relates to new and useful copolymers obtained by polymerizing 1,1-difluorobutadiene with a perfluorohalomonoolefin. In still another aspect, the invention relates to a method for the preparation of new and useful polymeric materials of 1,1-difluorobutadiene.

For a long time there has been a search for polymeric materials, including both thermoplastic and elastomeric polymeric materials, possessing the combined characteristics of a relatively high degree of resistance to hydrocarbon fuels, chemical and thermal stability, and which can be easily fabricated into a wide variety of useful articles. It is known that highly fluorinated polymers (for example, polytetrafluoroethylene and polychlorotrifluoroethylene), obtained by the homopolymerization of perfluorohalomonoolefins, have many useful applications by virtue of their chemical inertness, and high physical strength and resistance. At the same time, however, certain of their other physical properties, such as their insolubility in organic solvents at room temperature, requires that such polymers be used in the form of special dispersions when applying them, for example, as protective coatings; and that even then, fusion technique is necessary in order to form a continuous coating or film of the polymer.

It is, therefore, an object of this invention, to provide new and useful thermoplastic and elastomeric polymeric materials of 1,1-difluorobutadiene, which can be easily fabricated into a variety of articles of improved chemical and physical stability.

Another object of the invention is to provide new and useful thermoplastic and elastomeric copolymers of 1,1-difluorobutadiene and a perfluorohalomonoolefin, which can be easily fabricated into a variety of articles of improved chemical and physical stability.

A further object is to provide a method for the preparation of the aforementioned new and useful homopolymeric and copolymeric materials.

Various other objects and advantages inherent in the present invention will become apparent to those skilled in the art from the accompanying description and disclosure.

The above objects are accomplished by the process, more particularly described below, which comprises polymerizing 1,1-difluorobutadiene either by homopolymerization or by copolymerization with a perfluorohalomonoolefin in the presence of a polymerization catalyst at temperatures between about 0° C. and about 75° C. Polymers thus obtained are valuable macromolecules, which are adaptable to a number of commercial uses, based on the fact that their various properties range from those of rigid resinous thermoplastics to tough hard rubber-like materials possessing varying degrees of flexibility, elasticity and extensibility, which are easily vulcanized and processed.

The homopolymer of 1,1-difluorobutadiene is a non-extensible resinous thermoplastic which has good resistance to oils and hydrocarbon-fuels, is selectively soluble in various organic solvents, and can be easily processed by conventional molding and coating techniques. When 1,1-difluorobutadiene is copolymerized with the perfluorohalomonoolefins of this invention, a polymeric material is produced which has the combined desirable properties of poly-1,1-difluorobutadiene with those of the polyperfluorohalomonoolefin. This copolymer is chemically and thermally stable, resistant to oil and hydrocarbon-fuels, selectively soluble in organic solvents, and can be molded by conventional techniques to yield a wide variety of useful articles. The copolymers are especially suited and useful as durable, flexible protective coatings on surfaces which are to be subjected to environmental conditions in which they may come into contact with corrosive substances, for example, oils, fuels and strong chemical reagents.

As stated above, the copolymers of the present invention are prepared from 1,1-difluorobutadiene and a perfluorohalomonoolefin as comonomer. In order to obtain copolymers possessing the desired properties as set forth above, the comonomer is a perfluorohalomonoolefin containing at least two atoms of fluorine and having any other halogen atom selected from the group consisting of chlorine and bromine. The comonomer is employed, therefore, either in the form of a perfluoromonoolefin; or in the form of a perfluorochloroolefin; or in the form of a perfluorobromoolefin. Suitable perfluoromonoolefins include those containing an ethylenic point of unsaturation, such as perfluoroethylene, perfluoropropene, perfluoroisobutene, perfluorocyclobutene, and those containing an acetylenic point of unsaturation, such as perfluorobutyne and perfluoropropyne. The prefluorochloromonoolefins used in accordance with this invention include dichlorodifluoroethylene, chlorotrifluoroethylene, trichlorotrifluoropropene, and chloropentafluoropropene. The perfluorobromomonoolefins used in accordance with this invention include bromotrifluoroethylene. The physical nature of the copolymers of this invention depends upon the particular perfluorohalomonoolefin copolymerized with the 1,1-difluorobutadiene, as will become apparent from the examples presented herein.

The most useful copolymers produced in accordance with this invention contain between about 25 and 99 mole percent of 1,1-difluorobutadiene, the remaining major constituent being a perfluorohalomonoolefin present in an amount between about 1 and about 75 mole percent. Copolymers containing between about 25 and about 95 mole percent of 1,1-difluorobutadiene are preferred. Although copolymers of 1,1-difluorobutadiene containing as little as between about 1 and about 5 mole percent of a perfluorohalomonoolefin as a comonomer, possess different physical and chemical properties as compared to the homopolymer of 1,1-difluorobutadiene, it is preferable to have at least 5 mole percent of perfluorohalomonoolefin present in the copolymers of this invention, in order to obtain markedly increased chemical and thermal stability and resistance to hydrocarbon fuels in the copolymers, as compared to that of the homopolymer of 1,1-difluorobutadiene. It has been found that 1,1-difluorobutadiene polymerizes at a considerably faster rate than do the perfluorohalomonoolefin comonomers of this invention. No feed consisting of 1,1-difluorobutadiene and a pure perfluorohalomonoolefin, such as those indicated above, e.g., perfluoroethylene, chlorotrifluoroethylene, dichlorodifluoroethylene, will yield a copolymer of the same composition as the feed. In order to obtain a copolymer containing between about 25 and about 99 mole percent of 1,1-difluorobutadiene based on the total weight of monomers present in the copolymer, it is necessary to use an initial charge of monomers ranging from about 10:90 to about 60:40 molar ratio of 1,1-difluorobutadiene:comonomer. For the preferred copolymers containing between about 25 and about 95 mole percent of 1,1-difluorobutadiene based on the total weight of monomers present in the copolymer, it is necessary to use an initial charge of monomers ranging from about 10:90 to about 50:50 molar ratio of 1,1-difluorobutadiene: comonomer. A charge consisting of equimolar amounts of 1,1-difluorobutadiene and a readily polymerizable perfluorohalomonoolefin, such as perfluoroethylene, chlorotrifluoroethylene, and dichlorodifluoroethylene, leads to copolymers which contain at least 15 mole percent of the perfluorohalomonoolefin; whereas, an equimolar charge of 1,1-difluorobutadiene and a less readily polymerizable perfluorohalomonoolefin comonomer, such as perfluoropropene, chloropentafluoropropene, and perfluorocyclobutene, will lead, in general, to the production of copolymers containing less than 15 mole percent of such monoolefins. It has been found that as the molar amount of the perfluorohalomonoolefin is increased with respect to the molar amount of 1,1-difluorobutadiene present in the monomer charge, the higher will be the mole percent of the monoolefin incorporated in to the copolymer produced by the method described herein.

The polymers of this invention are prepared by employing one of a number of free radical-promoted polymerization systems, the polymerization being conducted within the aforementioned temperature range between about 0° C. and about 75° C. The preferred temperature is determined by the catalyst and/or the type polymerization system employed. The polymerization promoters found to be suitable in initiating the polymerizations described herein are of the peroxy type, as more fully hereinafter discussed, and are used either in suspension, emulsion, or mass polymerization systems. The emulsion system is preferred.

Of the water suspension type catalyst systems which may be used, a redox catalyst system is preferred comprising an oxidant and a reductant. The oxidant in the water suspension type recipe is preferably an inorganic persulfate, such as potassium persulfate, sodium persulfate or ammonium persulfate. The reductant is preferably a bisulfite such as potassium bisulfite, sodium bisulfite, potassium metabisulfite or sodium metabisulfite. The oxidant in the suspension redox recipe comprises between about 0.1 and about 5 parts by weight per 100 parts of total monomer or monomers present, and preferably comprises between about 0.5 and about 2 parts by weight, per 100 parts of total monomer or monomers present. The reductant, for example, sodium metabisulfite, comprises between about 0.05 and about 5.0 parts by weight per 100 parts of total monomer or monomers present, and preferably comprises between about 0.1 and about 2 parts by weight, per 100 parts of total monomer or monomers present. It has been found that the presence of sodium tetraborate along with the oxidant and reductant renders such a system a particularly good one for the preparation of the polymers of this invention in a suspension type polymerization system. It is within the scope of this invention to conduct the polymerization with the aforementioned suspension type recipe to which between about 0.01 and about 1.0 part by weight, per 100 parts of total monomer or monomers present, of a variable valence metal salt has been added. The variable valence metal salt is preferably an iron salt, such as ferrous sulfate or ferrous nitrate and its purpose is to regenerate the oxidant. When producing the polymers of this invention in the persulfate-bisulfite suspension system, it is preferable to use a temperature between about 25° C. and about 60° C., but lower temperatures, for example, between about 5° C. and about 25° C. are preferably employed when a variable valence metal salt is present in the system. It is also within the scope of this invention to carry out the polymerization reactions with a water suspension recipe in which the catalyst system contains only the oxidant, eliminating the presence of the reductant as well as the variable valence metal salt, if so desired.

Higher percent conversions of monomer or monomers to polymers are obtained by conducting the polymerizations using an emulsion catalyst system to initiate the polymerization reaction, rather than a suspension catalyst system. The emulsion recipes used in accordance with this invention are those comprising water, a soap and a peroxy compound. The different types of emulsion systems are conveniently differentiated on the basis of the catalyst system used to initiate the polymerization. One type is that in which the polymerization is initiated by employing a redox catalyst system comprising between about 0.01 and about 1.0 part, by weight per 100 parts of total monomer or monomers present, of an organic oxidant and an activator solution. Typical examples of the organic oxidants which are used in the presently described emulsion catalyst system are cumene hydroperoxide, diisopropylbenzene hydroperoxide, t-butylisopropylbenzene hydroperoxide, triisopropylbenzene hydroperoxide, methylcyclohexane hydroperoxide, t-butyl perbenzoate and tertiary-butyl hydroperoxide. A typical activator solution which is employed is that comprising between about 0.01 and about 1.0 part by weight, per 100 parts of total monomer or monomers present, of a variable valence metal salt, for example, ferrous sulfate; between about 0.1 and about 10.0 parts by weight of sodium pyrophosphate; and between about 0.1 and about 10.0 parts by weight of a reducing sugar, such as dextrose, fructose, or levulose. The presence of the sodium pyrophosphate and the reducing sugar stabilizes the concentration of the lower valence state of the metal of the variable valence metal salt.

A second type of emulsion catalyst system is that which comprises between about 0.05 and about 5.0 parts by weight, per 100 parts of total monomer or monomers present, of a persulfate as the oxidant; and preferably comprises between about 0.1 and about 0.5 part by weight of any of the persulfates mentioned above as suitable for the polymerization in aqueous suspension systems.

The soap employed as the emulsifier in either the redox or persulfate emulsion catalyst systems is preferably a metal salt, such as the potassium or sodium salts, derived from saturated aliphatic acids, the optimum chain length of the acid being between about 14 and about 20 carbon atoms. Such a soap is used in an amount between 0.5 and about 10 parts by weight per 100 parts of total monomer or monomers present. The emulsion polymerization preferably is conducted under alkaline conditions. It is desirable in the emulsion systems that the pH be maintained within the limitations between about 9 and 11 in order to prevent gelling of the soap, a condition which oftentimes results in slowdown or stoppage of the polymerization. It is sometimes necessary to maintain the pH of the medium between the aforementioned pH limits by the addition of suitable buffers. Typical examples of these buffers are solutions comprising 21.3 ml. 0.1 N—NaOH and 50 ml. 0.1 M $H_3BO_3$ diluted to 100 ml; or 43.9 ml. 0.1 N—NaOH and 50 ml. 0.1 M $H_3BO_3$ diluted to 100 ml.

As indicated above, the polymerization reaction may also be carried out under the aforementioned temperature conditions (with a temperature between about 5° C. and about 60° C. being preferred) in a mass polymerization system employing an organic peroxide promoter. Of these promoters, substituted acetyl peroxides are preferably employed in carry out the copolymerization. Trichloroacetyl peroxide is a preferred promoter of this type. Other halogen-substituted organic peroxides which are suitable for carrying out the copolymerization in a mass polymerization system are trifluoroacetyl peroxide, difluoroacetyl peroxide, 2,4-dichlorobenzoyl peroxide, chloroacetyl peroxide, trifluorodichloropropionyl peroxide, and dichlorofluoroacetyl peroxide.

The temperature employed when conducting the polymerizations of this invention in an emulsion type recipe is preferably between about 5° C. and 60° C. The lower temperatures, for example, between about 5° C. and about 35° C. are used for the redox emulsion system, and the higher temperatures, for example, between about 35° C. and about 60° C., are preferred when employing the persulfate catalyst emulsion system.

The polymerization reactions described herein to produce the polymers of 1,1-difluorobutadiene of the present invention are carried out under autogenous conditions of pressure.

The polymers of the present invention are particularly suited and useful as durable flexible coatings for application to metal or fabric surfaces in which lack of rigidity or drape is not a prime requisite. Particularly useful solvents comprise the aliphatic and aromatic esters, the ether alcohols, ketones, and halogenated hydrocarbons. Typical examples of these solvents are di-isobutyl ketone, methyl ethyl ketone, methyl isobutyl ketone, ethoxy ethanol, ethyl benzoate, carbon tetrachloride, and 1,1,3-trichlorotrifluoroethane. In this respect, it is often desirable to reduce the molecular weight of the finished homopolymer of 1,1-difluorobutadiene or the copolymers of this invention containing 1,1-difluorobutadiene, in order to obtain greater solubility in organic solvents, such as those indicated above. This is of importance in order to vary the softness of the polymers for easier processability. Reduction of the strength of the recipe of polymerization catalyst merely slows the rate of reaction without affecting, appreciably, the molecular weight of the finished copolymer. It has been found, however, that the addition of various polymerization modifiers appreciably reduces the molecular weight of the copolymer products, and increases their solubility and ease of processability without affecting, unduly, the overall yield. Suitable polymerization modifiers include chloroform ($CHCl_3$), Freon 113 ($CF_2ClCFCl_2$), carbon tetrachloride ($CCl_4$), trichloroacetyl chloride ($CCl_3COCl$), dodecyl mercaptan ($C_{12}H_{25}SH$), and bromotrichloromethane ($CBrCl_3$). These modifiers are preferably added in amounts between about 1 to about 10 parts, by weight per 100 parts of total 1,1-difluorobutadiene or monomers charged to the polymerization reaction. Of these modifiers, dodecyl mercaptan is preferred. This particular modifier appears to be much more powerful in function, than any of the others disclosed above and is, therefore, preferably employed in quantities ranging from about 0.01 to about 0.3 part per 100 parts of total monomer charged to the polymerization reaction.

The following examples are offered as a better understanding of the present invention and are not to be construed as limiting its scope.

*Example 1*

This example is intended to illustrate the homopolymerization of 1,1-difluorobutadiene in a water suspension redox catalyst system. The charge added to the polymerization tube represents 5 percent by weight of the following recipe:

| | Parts by weight |
|---|---|
| Water | 200 |
| 1,1-difluorobutadiene | 100 |
| Potassium persulfate ($K_2S_2O_8$) | 1.0 |
| Sodium metabisulfite ($Na_2S_2O_5$) | 0.4 |
| Sodium tetraborate ($Na_2B_4O_7 \cdot 10H_2O$) | 0.5 |

A clean 20 ml. glass polymerization tube was charged with the following ingredients and was frozen in a Dry Ice-acetone bath after the addition of the reductant and oxidant:

(1) 5.0 ml. of a solution obtained by dissolving 0.020 gram of sodium metabisulfite and 0.025 gram of sodium tetraborate in deionized water;

(2) 5.0 ml. of a 1% solution of potassium persulfate; and (3) 5.0 grams of 1,1-difluorobutadiene.

The glass polymerization tube was sealed under vacuum at liquid nitrogen temperature, and then shaken in a water bath whose temperature was automatically controlled at 50° C. At the end of 23 hours, the tubes were frozen in a Dry Ice-acetone bath, vented and then opened. The polymer was collected, washed several times with hot water and finally dried to constant weight in a vacuum oven set at 35° C. Polymeric 1,1-difluorobutadiene was obtained as a non-extensible thermoplastic material, in yield representing a 4 percent conversion.

*Example 2*

This example is intended to illustrate the preparation of the homopolymer of 1,1-difluorobutadiene employing an emulsion catalyst system. The charge added to the polymerization tube represents 5% by weight of the following recipe:

| | Parts by weight |
|---|---|
| Water, deionized | 200 |
| 1,1-difluorobutadiene | 100 |
| KORR soap | 5.0 |
| Potassium persulfate | 0.3 |
| Dodecylmercaptan | 0.3 |

A clean 20 ml. glass polymerization tube was charged with the following ingredients:

(1) 9 ml. of a soap solution prepared by dissolving 0.25 gram of potassium fatty acid soap (KORR soap) in 9 ml. of deionized water by stirring and heating at a temperature not in excess of 50° C. When solution was complete, the solution was cooled to room temperature (22° C.) and the pH adjusted to 10.2; 0.015 gram of tertiary-dodecylmercaptan were added and the resulting mixture stirred and frozen solid in a freezing bath consisting of a slush of Dry Ice and trichloroethylene;

(2) 1.0 ml. of a 1.5% solution of potassium persulfate; and (3) 5.0 grams of 1,1-difluorobutadiene.

The glass polymerization tube was sealed under vacuum at liquid nitrogen temperature and then placed in a water bath at 50° C. and the contents shaken for a period of 24 hours. At the end of this period the tube was frozen in liquid nitrogen to reduce the vapor pressure resulting from unreacted monomers and at the same time to coagulate the polymer. The contents of the tube were then removed and washed with distilled water until free of soap. The washed contents were then dried to constant weight in vacuo at 35° C. Polymeric 1,1-difluorobutadiene was obtained as a non-extensible thermoplastic material in a yield representing an 85 percent conversion of monomer to polymer. Upon analysis this polymer, poly-1,1-difluorobutadiene, was found to contain 41.9 percent fluorine.

Examples 3 and 4 are offered to illustrate the preparation of the copolymers of this invention using a water suspension redox catalyst system.

*Example 3*

A 20 ml. glass polymerization tube was charged with the same catalyst solution as set forth in Example 1, above, and further charged with 2.18 grams of 1,1-difluorobutadiene and 2.82 grams of chlorotrifluoroethylene, representing a 50:50 molar charge of monomers. The polymerization reaction was carried out under similar conditions as set forth in Example 1. An extensible rubbery polymer was obtained comprising 16 mole percent of chlorotrifluoroethylene (based on percent chlorine found) and the remaining major constituent was 1,1-difluorobutadiene. The copolymer was obtained in yield representing a 10 percent conversion.

Example 4

A 20 ml. glass polymerization tube was charged with the same catalyst solution as set forth in Example 1, above, and further charged with 2.02 grams of 1,1-difluorobutadiene and 2.98 grams of 1,1-dichloro-2,2-difluoroethylene, representing a 50:50 molar charge of monomers. The polymerization reaction was carried out under similar conditions as set forth in Example 1. An extensible rubbery polymer was obtained containing 23.5 mole percent of 1,1-dichloro-2,2-difluoroethylene (based on percent chlorine found) and 76.5 mole percent of 1,1-difluorobutadiene. The copolymer was obtained in an amount representing a 15 percent conversion.

Examples 5 through 13 are intended to illustrate the preparation of the copolymers of this invention in an emulsion persulfate catalyst system.

Example 5

A 20 ml. glass polymerization catalyst was charged with the same catalyst solution as set forth in Example 2, above, and further charged with 1.87 grams of 1,1-difluorobutadiene and 3.13 grams of perfluoropropene. The polymerization was carried out as set forth in Example 2. As a result of this procedure a tough rubbery copolymer was obtained which was found upon analysis to comprise 92.5 mole percent of 1,1-difluorobutadiene, the remaining major constituent being perfluoropropene. The copolymer was obtained in a yield representing a 26.8 percent conversion.

Example 6

A 20 ml. glass polymerization tube was charged with the same ingredients as set forth in Example 2, above, except that the monomers present comprised 1.78 grams of 1,1-difluorobutadiene and 3.22 grams of perfluorobutyne-2. The polymerization reaction was carried out under similar conditions as set forth in Example 2. A resinous thermoplastic material was obtained comprising 96 mole percent of 1,1-difluorobutadiene; percent conversion of monomers to copolymer was 14 percent.

Example 7

A 20 ml. glass polymerization tube was charged with the same ingredients as set forth in Example 2, above, except that the monomers comprised 1.55 grams of 1,1-difluorobutadiene and 3.45 grams of perfluoroisobutene. The polymerization reaction was carried out under similar conditions as set forth in Example 2. A resinous thermoplastic material containing 88 mole percent of 1,1-difluorobutadiene and 12 mole percent of perfluoroisobutene was obtained in an 8.6 percent conversion of monomers to copolymer.

Example 8

A 20 ml. of glass polymerization tube was charged with the same ingredients as set forth in Example 2, above, except that the monomers comprised 1.78 grams of 1,1-difluorobutadiene and 3.22 grams of perfluorocyclobutene. The polymerization reaction was carried out under similar conditions as set forth in Example 2. A tough rubbery copolymer was obtained in a yield of 28.8%, with 1,1-difluorobutadiene being present in an amount of 96.5 mole percent.

Example 9

A 20 ml. glass polymerization tube was charged with the same ingredients as set forth in Example 2, above, except that the monomers comprised 2.02 grams of 1,1-difluorobutadiene and 2.98 grams of 1,1-dichloro-2,2-difluoroethylene. The polymerization reaction was carried out under similar conditions as set forth in Example 2 except that the polymerization time was shortened to 22 hours. At the end of this time and following the procedure set forth in Example 2, a tough, very elastic rubber was obtained in a yield representing a 43 percent conversion with 1,1-difluorobutadiene being present in an amount of 84 mole percent.

The percent volume increase of the raw polymer as determined in ASTM fuel, type II, which consists of isooctane (60% by volume), benzene (5% by volume), toluene (20% by volume), and xylene (15% by volume) was 64%. After molding a sample sheet of the raw copolymer at 300° F., the copolymers remained soft and flexible.

Example 10

A 20 ml. glass polymerization tube was charged with the same ingredients as set forth in Example 2, above, except that the monomers comprised 2.06 grams of 1,1-difluorobutadiene and 2.94 grams of chlorotrifluoroethylene. The polymerization reaction was carried out under similar conditions as set forth in Example 2 except that the polymerization time was shortened to 22 hours. At the end of this time and following the procedure set forth in Example 2, a rubbery copolymer was obtained in a yield representing 38 percent conversion with 1,1-difluorobutadiene being present in an amount of 85 mole percent.

The percent volume increase of the raw polymer as determined in ASTM fuel, type II, which consists of isooctane (60% by volume), benzene (6% by volume), toluene (20% by volume), and xylene (15% by volume) was 50%. After molding a sample of this copolymer in the form of a sheet at 300° F., the sample was found to be soft and flexible.

Example 11

A 20 ml. glass polymerization tube was charged with the same ingredients as set forth in Example 2, above, except that the monomers comprised 1.75 grams of 1,1-difluorobutadiene and 3.25 grams of 2-chloropentafluoropropene. The polymerization reaction was carried out under similar conditions as set forth in Example 2. A resinous thermoplastic copolymer was obtained comprising 98 mole percent of 1,1-difluorobutadiene with the remaining major constituent of the copolymer being 2-chloropentafluoropropene (conversion of monomers to copolymer was 34.8 percent).

Example 12

A 20 ml. glass polymerization tube was charged with the same ingredients as set forth in Example 2, above, except that the monomers comprised 1.56 grams of 1,1-difluorobutadiene and 3.44 grams of 1,1,2-trichloro-3,3,3-trifluoropropene-1. The polymerization reaction was carried out under similar conditions as set forth in Example 2. A resinous thermoplastic copolymer was obtained in a yield representing a 32.2 percent conversion and was found upon analysis to comprise 1 mole percent of 1,1,2-trichloro-3,3,3-trifluoropropene-1 (based on percent chlorine found) and 99 mole percent of 1,1-difluorobutadiene.

Example 13

A 20 ml. glass polymerization tube was charged with the same ingredients as set forth in Example 2, above, except that the monomers comprised 1.79 grams of 1,1-difluorobutadiene and 3.21 grams of bromofluoroethylene. The polymerization reaction was carried out under similar conditions as set forth in Example 2. An extensible rubbery copolymer was obtained in a yield representing 11 percent conversion and was found upon analysis to comprise 92.5 mole percent of 1,1-difluorobutadiene, the remaining major constituent being bromotrifluoroethylene.

Example 14

This example is intended to illustrate the preparation of the copolymers of this invention in an emulsion system recipe. The charge added to the polymerization tube represents 5 percent by weight of the following recipe:

| | Parts by weight |
|---|---|
| Water, de-ionized | 200 |
| Monomers | 100 |
| KORR soap | 5.0 |
| Cumene hydroperoxide (100%) | 0.15 |
| $Na_4P_2O_7.7H_2O$ | 1.0 |
| $FeSO_4.7H_2O$ | 0.1 |
| Dextrose | 1.0 |
| Dodecylmercaptan | 0.3 |

A clean 20 ml. glass polymerization tube was charged with the following ingredients:

(1) 7.0 ml. of a soap solution prepared by dissolving 0.25 gram of potassium fatty acid soap (KORR soap) in 7 ml. of de-ionized water, solution being accomplished by stirring and heating not higher than 50° C. After cooling this solution to 30° C., the pH was adjusted to 10.0, and 0.015 gram of tertiary-dodecyl-mercaptan and 0.01 gram of a 75% cumene hydroperoxide solution were added with stirring. The polymerization tube was then placed in a freezing bath of liquid nitrogen;

(2) 3.0 ml. of activator solution prepared by dissolving 0.05 gram of sodium pyrophosphate decahydrate ($Na_4P_2O_7.10H_2O$) and 0.05 gram of anhydrous dextrose in 2.5 ml. of de-ionized water, solution being accomplished by heating at 90° C. under a stream of nitrogen. After holding the resulting solution at 90° C. for 10 minutes it was cooled to 60° C. and 0.005 gram of ferrous sulfate heptahydrate and 0.5 ml. of de-ionized water were added, followed by cooling of the resulting mixture to 30° C. before using;

(3) 2.37 grams of 1,1-difluorobutadiene; and (4) 2.63 grams of perfluoroethylene.

The glass polymerization tube was sealed under vacuum at liquid nitrogen temperature. This tube was warmed to 20° C. and the contents therein were shaken for a period of 23.5° hours. At the end of this period the tube was frozen in liquid nitrogen to reduce the vapor pressure resulting from unreacted monomers, and at the same time to coagulate the polymer. The contents of the tube were then removed and washed with a distilled water until free of soap. The washed contents were then dried to constant weight in vacuo at 35° C. At a result of this procedure, a tough rubbery product was obtained in 36.6 percent conversion. Upon analysis it was found that this tough rubbery copolymer contained 85 mole percent of 1,1-difluorobutadiene.

The percent volume increase of the raw polymer as determined in ASTM fuel, type II, which consists of isooctane (60% by volume), benzene (5% by volume), toluene (20% by volume), and xylene (15% by volume) was only 21%.

As previously indicated, the polymers of the present invention prepared by homopolymerizing 1,1-difluorobutadiene, or by copolymerizing with the perfluorohalomonoolefins previously described, possess highly desirable chemical and physical properties which make them useful and valuable materials. When used as protective coatings to metallic or fabric surfaces, the raw polymers of this invention may be dissolved in a suitable solvent, such as those described above, and applied by such methods as spraying, dipping or brushing, as desired. The coatings thus obtained have good resinous or elastomeric properties, depending upon the composition of the particular polymer used for this purpose, hardness, and high heat-resistance, and thus these polymers can be pressed into sheets, when in their raw polymeric state, at temperatures between about 200° F. and about 400° F.

The polymers of the present invention possess resistance to corrosive oils and fuels, to a marked degree, which makes them particularly useful for the manufacture and coating of articles which are to be subjected to exposure to such environment. The copolymers are also particularly suited as protective coatings which in the course of performing their function may come into contact with strong and corrosive chemicals, as well as corrosive oils and fuels. As a result of their excellent resistance to oils and fuels, the polymers of this invention are used, in a preferred form, in the manufacture of protective articles of clothing such as boots, suits, gloves, helmets, and in the fabrication of resistance gaskets, seals, pump and valve-diaphragms and the like.

Since certain changes may be made in carrying out the process of the present invention in producing the desired copolymers, without departing from the scope of the invention, it is intended that all matters contained in the above description is to be interpreted as illustrative and not necessarily in a limiting sense.

I claim:

1. A solid copolymer of 1,1-difluorobutadiene and a perfluorohalomonoolefin containing at least two atoms of fluorine and having any other halogen atom selected from the group consisting of chlorine and bromine, said copolymer containing between about 25 and about 95 mol percent of units corresponding to said 1,1-difluorobutadiene, and as substantially the sole remaining constituent between about 5 and about 75 mol percent of units corresponding to said perfluorohalomonoolefin.

2. A solid copolymer of 1,1-difluorobutadiene and a perfluorohalomonoolefin containing at least two atoms of fluorine and at least one halogen atom selected from the group consisting of chlorine and bromine, said copolymer containing between about 25 and about 95 mol percent of units corresponding to said 1,1-difluorobutadiene, and as substantially the sole remaining constituent between about 5 and about 75 mol percent of units corresponding to said perfluorohalomonoolefin.

3. A solid copolymer of 1,1-difluorobutadiene and a perfluoromonoolefin, said copolymer containing between about 25 and about 95 mol percent of units corresponding to said 1,1-difluorobutadiene, and as substantially the sole remaining constituent between about 5 and about 75 mole percent of units corresponding to said perfluoromonoolefin.

4. A solid copolymer of 1,1-difluorobutadiene and perfluoroethylene, said copolymer containing between about 25 and about 95 mol percent of units corresponding to said 1,1-difluorobutadiene, and as substantially the sole remaining constituent between about 5 and about 75 mol percent of units corresponding to said perfluoroethylene.

5. A solid copolymer of 1,1-difluorobutadiene and perfluoropropene, said copolymer containing between about 25 and about 95 mol percent of units corresponding to said 1,1-difluorobutadiene, and as substantially the sole remaining constituent between about 5 and about 75 mol percent of units corresponding to said perfluoropropene.

6. A solid copolymer of 1,1-difluorobutadiene and a perfluorochloromonoolefin, said copolymer containing between about 25 and about 95 mol percent of units corresponding to said 1,1-difluorobutadiene, and as substantially the sole remaining constituent between about 5 and about 75 mol percent of units corresponding to said perfluorochloromonoolefin.

7. A solid copolymer of 1,1-difluorobutadiene and chlotrifluoroethylene, said copolymer containing between about 25 and about 95 mol percent of units corresponding to said 1,1-difluorobutadiene, and as substantially the sole remaining constituent between about 5 and about 75 mol percent of units corresponding to said chlorotrifluoroethylene.

8. A solid copolymer of 1,1-difluorobutadiene and a dichlorodifluoroethylene, said copolymer containing between about 25 and about 95 mol percent of units corresponding to said 1,1-difluorobutadiene, and as substantially the sole remaining constituent between about 5 and about 75 mol percent of units corresponding to said dichlorodifluoroethylene.

9. A solid copolymer of 1,1-difluorobutadiene and a perfluorobromomonoolefin, said copolymer containing between about 25 and about 95 percent of units corresponding to said 1,1-difluorobutadiene, and as substantially the sole remaining constituent between about 5 and about 75 mol percent of units corresponding to said perfluorobromomonoolefin.

10. A solid copolymer of 1,1-difluorobutadiene and bromotrifluoroethylene, said copolymer containing between about 25 and about 95 mol percent of units corresponding to said 1,1-difluorobutadiene, and as substantially the sole remaining constituent between about 5 and about 75 mol percent of units corresponding to said bromotrifluoroethylene.

References Cited in the file of this patent

UNITED STATES PATENTS

| | | |
|---|---|---|
| 2,581,925 | Crane et al. | Jan. 8, 1952 |
| 2,686,207 | Crane et al. | Aug. 10, 1954 |
| 2,687,207 | Crane et al. | Aug. 10, 1954 |
| 2,742,454 | Rearick et al. | Apr. 17, 1956 |
| 2,750,431 | Tarrant et al. | June 12, 1956 |